United States Patent
Morelli et al.

(10) Patent No.: US 11,686,217 B2
(45) Date of Patent: Jun. 27, 2023

(54) OIL COLLECTOR FOR A TORQUE TRANSMISSION DEVICE OF AN AIRCRAFT TURBINE ENGINE

(71) Applicants: SAFRAN, Paris (FR); SAFRAN TRANSMISSION SYSTEMS, Colombes (FR)

(72) Inventors: Boris Pierre Marcel Morelli, Moissy-Cramayel (FR); Xavier Roger Betbeder-Lauque, Moissy-Cramayel (FR); Mathieu Jean Charrier, Moissy-Cramayel (FR)

(73) Assignees: SAFRAN, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/454,384

(22) Filed: Nov. 10, 2021

(65) Prior Publication Data
US 2022/0154598 A1    May 19, 2022

(30) Foreign Application Priority Data
Nov. 16, 2020   (FR) ...................................... 2011728

(51) Int. Cl.
*F01D 25/18*   (2006.01)
*F01D 15/12*   (2006.01)

(52) U.S. Cl.
CPC ............. *F01D 25/18* (2013.01); *F01D 15/12* (2013.01); *F05D 2220/323* (2013.01); *F05D 2260/40311* (2013.01); *F05D 2260/98* (2013.01)

(58) Field of Classification Search
CPC .... F01D 25/18; F01D 15/12; F05D 2220/323; F05D 2260/40311; F05D 2260/98
See application file for complete search history.

(56) References Cited

U.S. PATENT DOCUMENTS

| 3,788,426 A * | 1/1974 | Hull, Jr. ............. F16H 57/0415 184/6.12 |
| 10,859,155 B2 * | 12/2020 | Clark ...................... F01D 25/18 |
| 11,022,209 B2 * | 6/2021 | Baraggia Au Yeung .................... F16H 57/0486 |

(Continued)

FOREIGN PATENT DOCUMENTS

| EP | 2719927 A1 | 4/2014 |
| FR | 2942284 A1 | 8/2010 |

(Continued)

OTHER PUBLICATIONS

Simon, Mabrie, "Turbomachine Clevis with built-in filter and method of producing said clevis," WIPO, WO 2018/142058-A1, Aug. 9, 2018 (Year: 2018).*

(Continued)

*Primary Examiner* — Woody A Lee, Jr.
*Assistant Examiner* — Joshua R Beebe
(74) *Attorney, Agent, or Firm* — Womble Bond Dickinson (US) LLP (57) ABSTRACT

An oil collector for a torque transmission device of an aircraft turbine engine, this oil collector being configured to collect sprayed oil, wherein it includes at least one wall formed at least in part by a mesh structure, and at least one recovery device located at one end of the wall and configured to recover the oil captured by the wall and intended to flow from this wall to the recovery device.

19 Claims, 7 Drawing Sheets

(56) References Cited

U.S. PATENT DOCUMENTS

| | | | |
|---|---|---|---|
| 2011/0299974 | A1 | 12/2011 | Gauthier et al. |
| 2013/0225353 | A1 | 8/2013 | Gallet et al. |
| 2014/0106922 | A1* | 4/2014 | Hancox .................. F01D 25/18 |
| | | | 475/159 |

FOREIGN PATENT DOCUMENTS

| | | |
|---|---|---|
| FR | 2987416 A1 | 8/2013 |
| FR | 3008462 A1 | 1/2015 |
| FR | 3008463 A1 | 1/2015 |
| FR | 3041054 A1 | 3/2017 |
| FR | 3065773 A1 | 11/2018 |
| FR | 3073915 A1 | 5/2019 |
| FR | 3076853 A1 | 7/2019 |
| FR | 3092889 A1 | 8/2020 |
| WO | 2011/129076 A1 | 10/2011 |
| WO | 2019/141920 A1 | 7/2019 |

OTHER PUBLICATIONS

Charrier, Mathieu Jean et al., "Oil collector for speed reducer, in particular of a turbomachine, and associated speed reducer and turbomachine.", WIPO, WO 2019/141920A1, Jul. 25, 2019 (Year: 2019).*

Charrier, Mathieu, Jean et al., "Oil Collector for speed reducer, in particular of a turbomachine, and associated speed reducer and turbomachine.", FIT Translation by USPTO Search, WO 2019/141920A1, Jul. 25, 2019 (Year: 2019).*

Preliminary Research Report received for French Application No. 2011728, dated Jul. 6, 2021, 3 pages (1 page of French Translation Cover Sheet and 2 pages of original document).

\* cited by examiner

OIL COLLECTOR FOR A TORQUE TRANSMISSION DEVICE OF AN AIRCRAFT TURBINE ENGINE

TECHNICAL FIELD OF THE INVENTION

The invention relates to an oil collector for a torque transmission device of an aircraft turbine engine.

TECHNICAL BACKGROUND

The role of a torque transmission device such as a mechanical reduction gear, for example of the type described in the document FR-A1-3 076 853, is to modify the speed and torque ratio between the input axle and the output axle of a mechanical system. The prior art also includes the documents FR-A1-2 942 284, FR-A1-2 987 416, FR-A1-3 008 462, FR-A1-3 008 463, FR-A1-3 041 054, FR-A1-3 065 773, FR-A1-3 073 915 and FR-A1-3 092 889, as well as the documents WO-A1-2019/141920, EP-A1-2 719 927 and WO-A1-2011/129076.

The new generations of dual flow turbine engines, in particular those with a high bypass ratio, comprise a mechanical reduction gear to drive the shaft of a fan. Typically, the purpose of the reduction gear is to transform the so-called fast rotation speed of the shaft of a power turbine into a slower rotation speed for the shaft driving the fan.

Such a reduction gear consists of a central pinion, called the sun gear, a ring gear and pinions, called planet gears, which are engaged between the sun gear and the ring gear. The planet gears are held by a frame called a planet carrier. The sun gear, ring gear and planet carrier are planetary gears because their axes of revolution coincide with the longitudinal axis X of the turbine engine. The planet gears each have a different axis of revolution and are equally spaced on the same operating diameter around the axis of the planetary gears. These axes are parallel to the longitudinal axis X.

There are several reduction gear architectures. In the prior art of the dual flow turbine engines, the reduction gears are of the planetary or epicyclic type. In other similar applications, there are so-called differential or "compound" architectures:
- On a planetary reduction gear, the planet carrier is fixed and the ring gear is the output shaft of the device which rotates in the opposite direction to the sun gear.
- On an epicyclic reduction gear, the ring gear is fixed and the planet carrier is the output shaft of the device, which turns in the same direction as the sun gear.
- On a differential reduction gear, no element is fixed in rotation. The ring gear rotates in the opposite direction to the sun gear and the planet carrier.

The reduction gears can be composed of one or more meshing stages. This meshing is achieved in different ways, such as by contact, friction or magnetic fields. There are several types of contact meshing, such as straight or chevron toothings.

The meshings of the reduction gears are lubricated with oil. The lubricating oil is heated during operation as it absorbs the heat energy generated by the reduction gear. The temperature of the oil has an impact on its viscosity and lubrication efficiency. It is therefore important to drain the hot oil after lubrication of the reduction gear, so that it can be recycled.

However, once lubricated, the planet gears of the reduction gear centrifugally spray hot oil to neighbouring planet gears. This oil recirculation has several disadvantages, including and in particular: increase in ventilation losses in the reduction gear, increase in the temperature of the planet gears, reduction of the margin to seizure, increase of the oil outlet temperature for the sizing of the exchangers, higher air content in the oil, higher oil consumption, which reduces the low oil level in the oil tank, etc.

One solution to this problem consists of placing oil deflectors or oil collectors between the planet gears. The purpose of the deflectors is to divert the sprayed oil to a means for discharging and recycling the oil. The purpose of the oil collectors is to collect the sprayed oil and convey it to the means for discharging and recycling the oil.

However, there is a need for more efficient oil discharge from the oil collectors of the prior art and it has been observed that oil retention between the planet gears and the collector regularly occurs. This phenomenon results in the sparging of the planet gears, the increase in losses due to transfer of momentum, the degradation of the lubrication efficiency, the increase in the mass temperature of the pinions, and the reduction in the margin against seizure.

The present invention provides a solution to at least some of the above problems.

SUMMARY OF THE INVENTION

The invention proposes an oil collector for a torque transmission device of an aircraft turbine engine, this oil collector being configured to collect sprayed oil, characterised in that it comprises:
- at least one outer wall formed at least in part by a mesh structure, and
- at least one recovery device located at one end of the outer wall and configured to recover the oil captured by the outer wall and intended to flow from this wall to the recovery device.

The integration of a mesh structure at the level of the wall of the collector allows a level of porosity which slows down the flow of oil to a greater or lesser extent and thus allows the oil centrifuged by the planet gears to be recovered and evacuated "calmly" via the interior of the collector and prevent it from being re-swamped between the toothing. The invention thus allows to improve the oil discharge while reducing the risk of the appearance of bulges.

The invention thus allows, in particular, to ensure good oil suction, to reduce the losses by transfer of momentum, to reduce the mass temperature of the toothings, to reduce the heating of the components of the device and to increase the margin against seizure.

The collector, according to the invention, may comprise one or more of the following features, taken alone or in combination with each other:
- said outer wall has a constant thickness and/or said mesh structure has a constant thickness;
- said mesh structure is formed by a grid; this grid may have a constant or varying shape or composition;
- said grid is composed of parallelepipedal patterns such as rectangles or squares;
- each of the patterns comprises bars connected to each other, some of said bars extending along edges of this pattern;
- the collector comprises two independent outer walls formed respectively by two mesh structures, the collector having a general I-shape and said walls extend laterally along the two longer sides of this I;
- said outer walls are each generally curved and have convex curved surfaces facing each other; alternatively, these walls could be straight;

said outer walls are lateral walls and said recovery devices form end walls between said lateral walls;

a first recovery device extends between first ends of both outer walls and at one end of the I-shape, and a second recovery device extends between opposite second ends of those outer walls and at an opposite end of the I-shape;

said or each recovery device is generally U-shaped;

said or each recovery device comprises a bottom bulkhead extending between two lateral bulkhead, the lateral bulkheads each having a generally curved shape and extending in line with said outer walls;

said at least one outer wall and said at least one recovery device define an inner cavity of the collector which is free, i.e. this cavity is empty and unoccupied, to facilitate the flow of oil inside the collector.

The invention also relates to a torque transmission device for an aircraft turbine engine, this device comprising meshed toothings and at least one oil collector as described above, which is disposed adjacent to a toothing or interposed between two toothings and which is configured to collect oil centrifugally sprayed by at least one of these toothings.

Advantageously, each of said outer walls extending at least partially around one of the toothings and an axis of revolution of that toothing.

The device is, for example, an epicyclic or planetary reduction gear, an accessory gearbox, or a gearbox.

The invention also relates to a turbine engine, in particular for an aircraft, comprising an oil collector or device as described above.

BRIEF DESCRIPTION OF THE FIGURES

Other features and advantages of the invention will become apparent in the course of the following detailed description, for the understanding of which reference is made to the attached drawings in which.

DETAILED DESCRIPTION OF THE INVENTION

Figure 1:
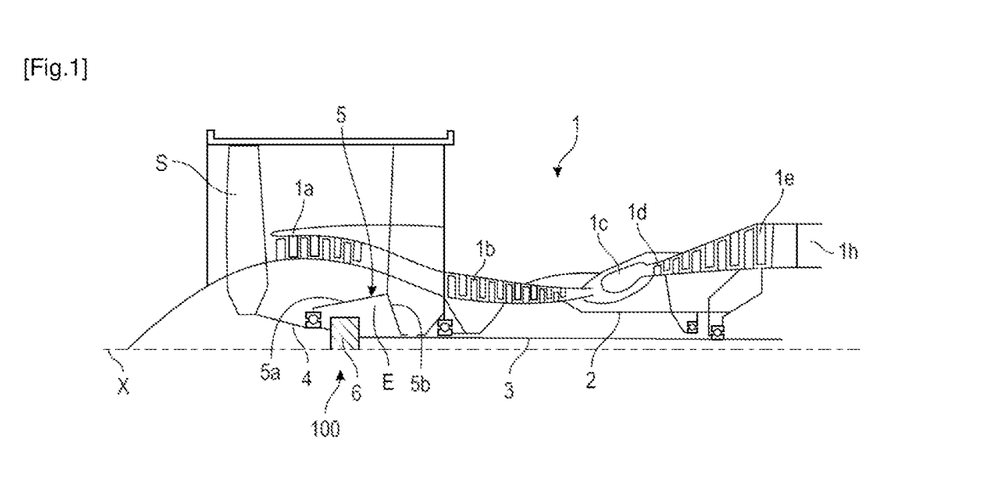
FIG. 1 is a schematic view of a turbine engine in axial section.

FIG. 1 describes a turbine engine 1 which conventionally comprises a fan S, a low-pressure compressor 1*a*, a high-pressure compressor 1*b*, an annular combustion chamber 1*c*, a high-pressure turbine 1*d*, a low-pressure turbine 1*e* and an exhaust nozzle 1*h*. The high-pressure compressor 1*b* and the high-pressure turbine 1*d* are connected by a high-pressure shaft 2 and together form a high-pressure (HP) body. The low-pressure compressor 1*a* and the low-pressure turbine 1*e* are connected by a low-pressure shaft 3 and together form a low-pressure (LP) casing.

The fan S is driven by a fan shaft 4 which is driven to the LP shaft 3 by means of a torque transmission device 100, in particular a reduction gear 6. This reduction gear 6 is generally of the planetary or epicyclic type.

Although the following description relates to a torque transmission device 100 of the planetary or epicyclic reduction gear 6 type, it also applies to a mechanical differential in which the three components, namely the planet carrier, the ring gear and the sun gear, are mobile in rotation, the rotational speed of one of these components depending in particular on the speed difference of the other two components.

The reduction gear 6 is positioned in the upstream part of the turbine engine 1. A fixed structure comprising schematically, here, an upstream part 5*a* and a downstream part 5*b* which makes up the motor casing or stator 5 is arranged so as to form an enclosure E surrounding the reduction gear 6. This enclosure E is closed upstream by seals at the level of a bearing allowing the passage of the fan shaft 4, and downstream by seals at the level of the passage of the LP shaft 3.

Figure 2:
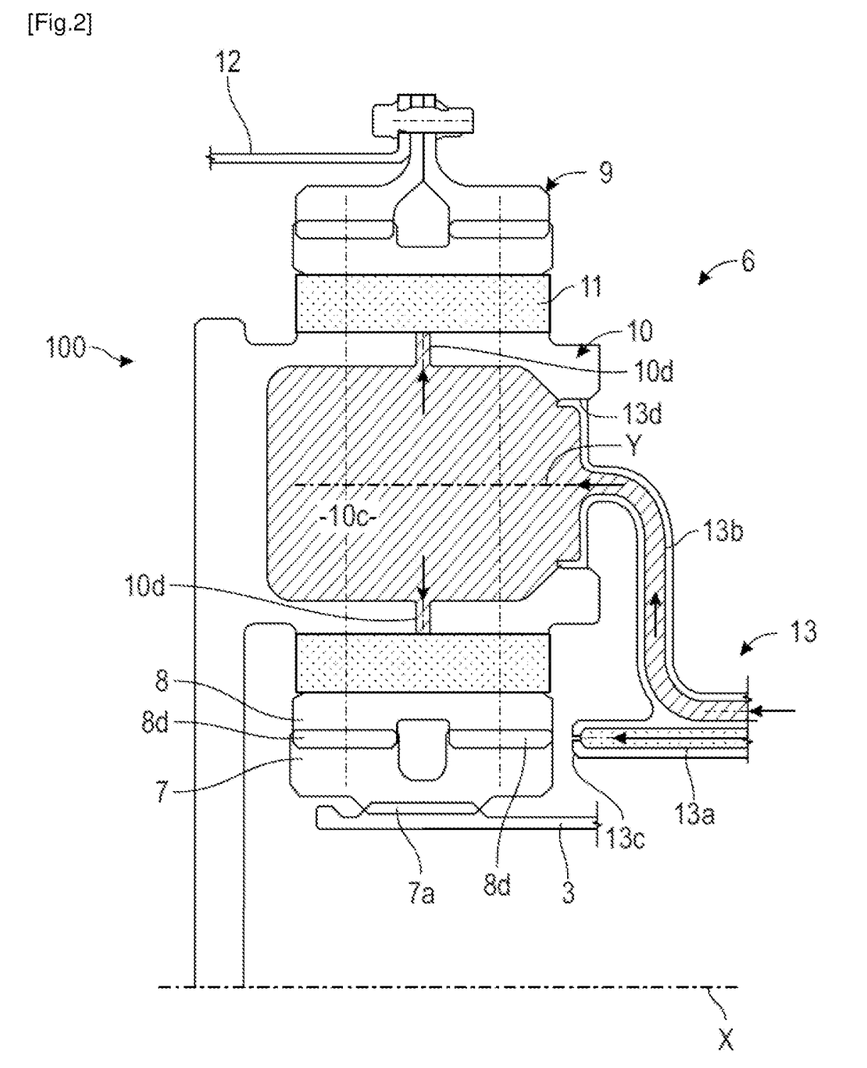
FIG. 2 is a partial schematic view of a torque transmission device in axial section.
Figure 3:
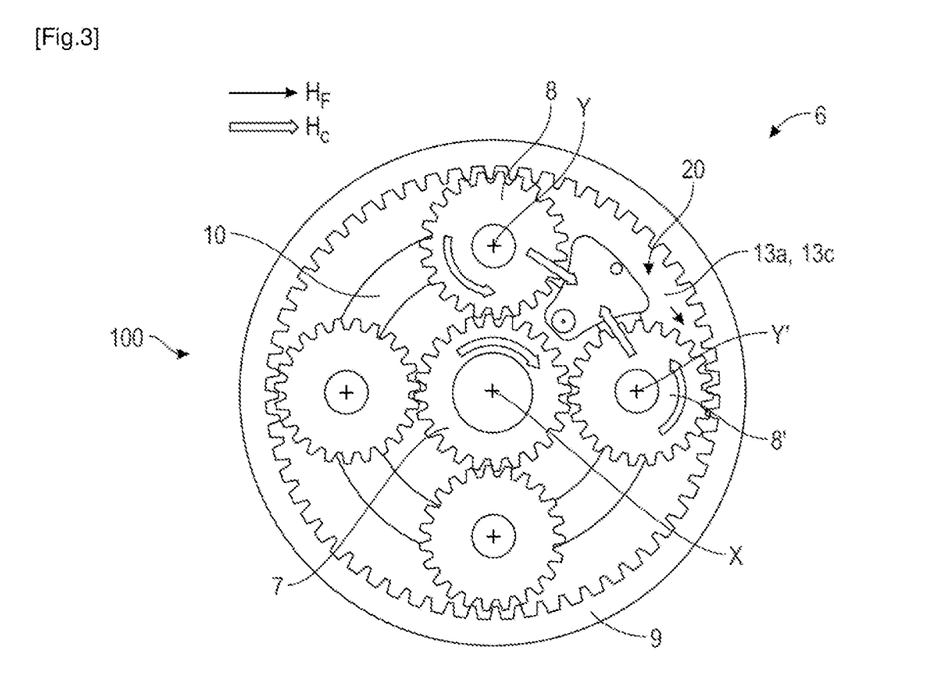
FIG. 3 is a schematic cross-sectional view of a torque transmission device.

FIGS. 2 and 3 show a reduction gear 6 which can take the form of different architectures depending on whether certain parts are fixed or in rotation. On the input side, the reduction gear 6 is connected to the LP shaft 3, for example via inner splines 7*a*. Thus the shaft BP 3 drives a planetary gear called the sun gear 7. Classically, the sun gear 7, whose axis of rotation is coincident with that of the turbine engine X, drives a series of pinions called planet gears 8, 8', which are equally spaced on the same diameter around the axis of rotation X. Each planet gear 8, 8' has toothings 8*d*, 8*d*' on its circumference. This diameter is equal to twice the operating centre distance between the sun gear 7 and the planet gears 8, 8'. The number of planet gears 8, 8' is generally defined between three and seven for this type of application.

The set of planet gears 8, 8' is held together by a frame called a planet carrier 10. Each planet gear 8, 8' rotates around its own axis Y, Y', and meshes with the ring gear 9.

At the output we have:

in an epicyclic configuration, the set of planet gears 8, 8' rotates the planet carrier 10 around the axis X of the turbine engine 1. The ring gear 9 is fixed to the engine casing or stator 5 via a ring gear carrier 12 and the planet carrier 10 is fixed to the fan shaft 4.

In a planetary configuration, the set of planet gears 8, 8' is held by a planet carrier 10 which is attached to the motor housing or stator 5. Each planet gear 8, 8' drives the ring gear 9 which is attached to the fan shaft 4 via a ring gear carrier 12.

Each planet gear 8, 8' is mounted freely rotatably by means of a bearing 11, for example a bearing or hydrostatic bearing.

The arrows in FIG. 2 describe the oil conveying in the reduction gear 6. The oil enters the reduction gear 6 from the stator part 5 into the distributor 13 by different means which will not be specified in this view because they are specific to one or more types of architecture. The distributor 13 is separated into 2 parts, each of which is generally repeated by the same number of planet gear 8, 8'. The function of the injectors 13*a* is to lubricate the toothings 8*d*, 8*d*' and the arms 13*b* are designed to lubricate the bearings 11. The oil is fed to the injectors 13*a* to exit through the ends 13*c* in order to lubricate the toothings 8*d*, 8*d*' of the planet gears 8, 8', the sun gear 7 and also the ring gear 9 with so-called cold oil ($H_F$). The oil is also fed to the arm 13*b* and circulates via the supply port 13*d* of the bearing 11. The oil then circulates through the shaft into a buffer zone or zones 10*c* and then out through the ports 10*d* to lubricate the bearings 11 of the planet gears 8, 8'.

Due to centrifugal forces, so-called hot oil ($H_C$) for lubricating the toothings 8d, 8d' is projected radially outwards with respect to the axes Y, Y' of the planet gears 8, 8'. In order to prevent this oil from interfering with the lubrication of the adjacent planet gears 8, 8', the reduction gear 6 comprises at least one oil collector 20 arranged next to a toothing 8d, 8d' or interposed between two toothings 8d, 8d', i.e., in this case the toothings 8d, 8d' of the planet gears 8, 8'. Although FIG. 3 shows a single collector 20, the reduction gear 6 comprises a collector 20 between two adjacent planet gears 8, 8' and therefore comprises as many collectors 20 as there are planet gears 8, 8', namely four in the example shown.

Figure 4:
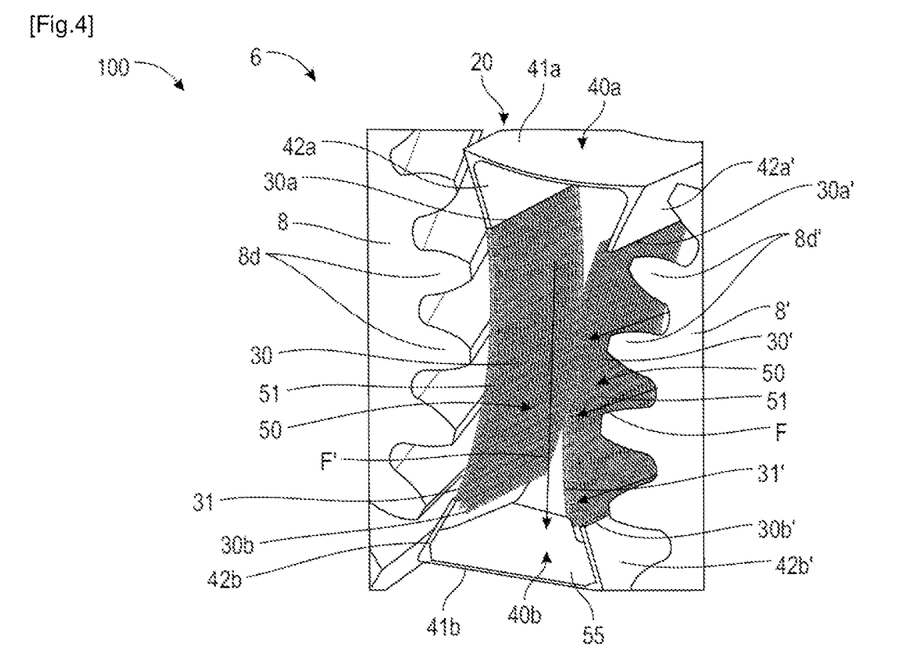
FIG. 4 is a detailed schematic perspective view of the torque transmission device comprising a collector.
Figure 5:
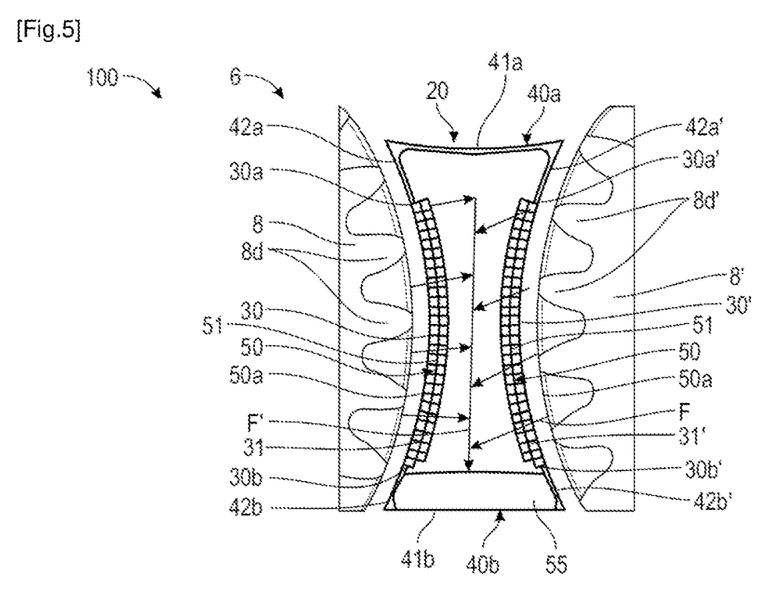
FIG. 5 is a schematic detailed perspective view of the torque transmission device comprising the collector.
Figure 6:
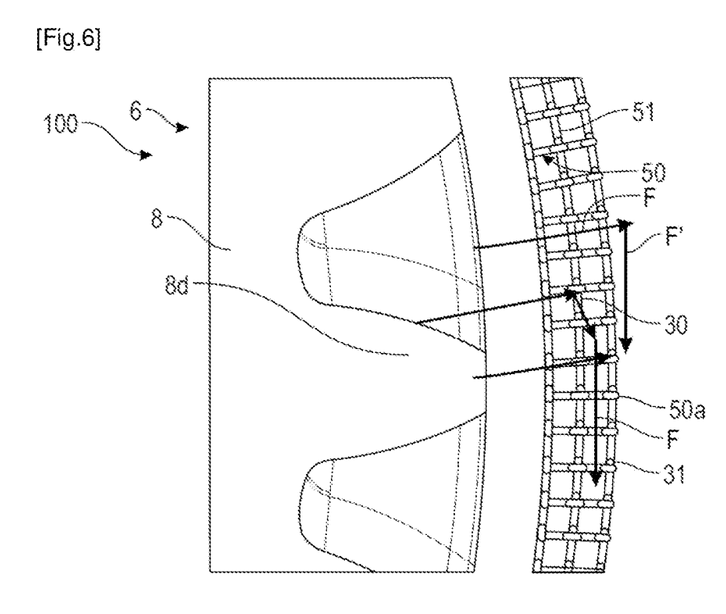
FIG. 6 is a detailed schematic perspective view of the torque transmission device comprising the collector.

FIGS. 4, 5, 6 show two adjacent planet gears 8, 8' of the reduction gear 6 on either side of one of the oil collectors 20. The oil collector 20 is configured to collect sprayed oil, in particular sprayed centrifugally by at least one of the toothings 8d, 8d' belonging here to the planet gears 8, 8'.

The collector 20 comprises at least one wall 30, 30', in particular having a constant thickness, and here two walls 30, 30' which are in particular spaced apart from each other and for example interposed between two adjacent toothings 8d, 8d'.

In the present application, "wall" is understood to mean an outer wall which therefore extends outside the collector and can be directly exposed to an oil jet. Each of the walls thus comprises an outer surface defining an outer surface of the collector.

The two walls 30, 30' are in particular independent, the collector 20 having for example a general I-shape and the walls 30, 30' extending laterally along the two longer sides of this I. These walls 30, 30' have in particular convex curved surfaces 31, 31' facing each other. Each wall 30, 30' has, for example, a generally curved shape and extends, in particular, at least partly around the toothing 8d, 8d' in front of which it is located and around an axis of revolution Y, Y' of this toothing 8d, 8d'.

In particular, each of the walls 30, 30' is respectively formed at least in part by a mesh structure 50, also called a lattice. In particular, the mesh structure 50 has a constant thickness. The mesh structure 50 is in particular formed by a grid 51. This grid 51 may have a constant or varying shape or composition. The grid 51 is composed of parallelepipedal patterns 50a or cells such as rectangles or squares. The mesh structure 50 is in particular formed by the spatial repetition, either for the matter or for the void, of a single pattern or cell 50a. The pattern 50a is in particular formed by the interconnection of simple shapes to be chosen in particular from spheres or ovals and bars of constant (or variable) cross-section, in particular circles, rectangles or octagons. The pattern 50a is arranged so that voids between the matter communicate so as to provide paths through the matter for the passage of oil.

The collector 20 also comprises at least one recovery device 40a, 40b located at one end 30a, 30a', 30b, 30b' of the wall 30, 30'.

The collector 20 here comprises two recovery devices 40a, 40b. A first 40a of the recovery devices extends between first ends 30a, 30a' of the two walls 30, 30' and at one end of the I-shape, and a second 40b of the recovery devices extends between opposite second ends 30b, 30b' of these walls 30, 30' and at an opposite end of the I-shape.

The recovery devices 40a, 40b are configured to recovery oil captured by the walls 30, 30' and intended to flow from the walls 30, 30' to each of the recovery devices 40a, 40b.

In particular, the recovery devices 40a, 40b are generally U-shaped.

The recovery devices 40a, 40b comprise a bottom bulkhead 41a, 41b which extends between two lateral bulkheads 42a, 42a', 42b, 42b'. The lateral bulkheads 42a, 42a', 42b, 42b' each have a generally curved shape and extend in line with the walls 30, 30'. The lateral bulkheads 42a, 42a', 42b, 42b' of the same wall 30, 30' are therefore also convexly curved opposite each other. Each lateral bulkhead 42a, 42a', 42b, 42b' has a generally curved shape and extends respectively in part around the facing toothing 8d, 8d' and the axis of revolution Y, Y' of these toothings 8d, 8d'.

The lateral bulkheads 42a, 42a', 42b, 42b' form, together with the bottom bulkhead 41a, 41b, the U-shape of each recovery device 40a, 40b.

More specifically, in an extension of the wall 30 is the lateral bulkhead 42a of the first recovery device 40a, with the end 30a being between the wall 30 and the lateral bulkhead 42a. In the opposite extension of the wall 30 is the lateral bulkhead 42b of the second recovery device 40b, with the end 30b between the wall 30 and the lateral bulkhead 42b.

Similarly, in an extension of the wall 30' is the lateral bulkhead 42a' of the first recovery device 40a, with the end 30a' between the wall 30' and the lateral bulkhead 42a'. In the opposite extension of wall 30' is the lateral bulkhead 42b' of the second recovery device 40b, with the end 30b' between the wall 30' and the lateral bulkhead 42b'.

The collector 20 thus has a cavity formed by the walls 30, 30' and the recovery devices 40a, 40b.

The oil, projected by the toothing 8d, 8d', penetrates the matter of the mesh structure 50 of the wall 30, 30'. The oil is then slowed down and flows through the mesh structure 50 and through the surfaces 31, 31' of the walls 30, 30' of the collector 20 according to a direction referenced F. The oil is then directed to the recovery device 40a, 40b of the collector 20 according to a direction referenced F'. The oil (referenced 55 as it passes over the recovery device 40a, 40b) will then be discharged.

Figure 7:
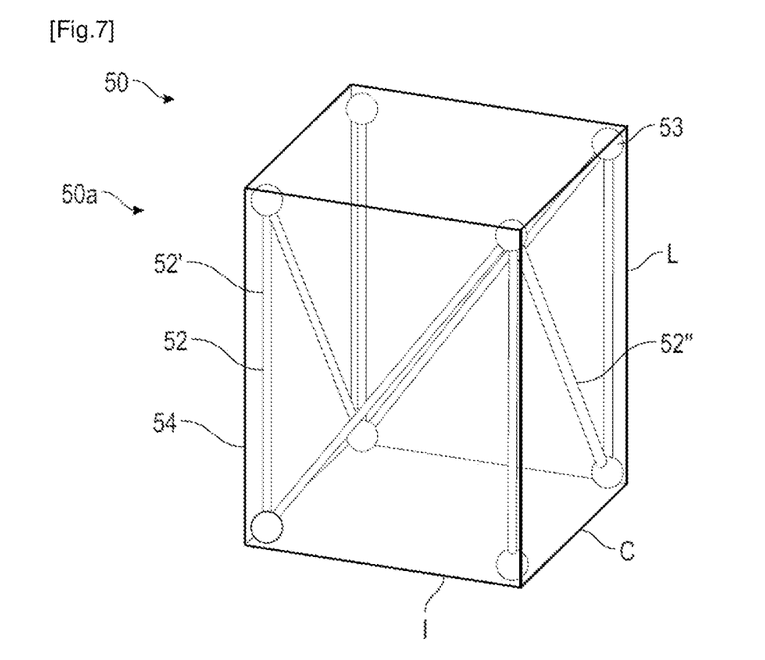
FIG. 7 is a detailed schematic perspective view of a mesh pattern of a wall of the collector.

Each of the patterns 50a, as shown in FIG. 7, comprises bars 52 connected to each other. This pattern 50a occupies a parallelepiped-shaped volume, in particular a rectangular parallelepiped with a long side L, an intermediate side l and a short side c. Some 52' of the bars 52 extend along edges 54 of this pattern 50a, in this case four bars 52' extend along four edges 54 of this pattern 50a, in particular the four edges 54 forming the longest dimension L of the rectangular parallelepiped. Some 52" of the bars 52 extend along faces of this pattern 50a, in this case four bars 52" extend along four faces of this pattern 50a, in particular on the faces forming the longest dimension of the rectangular parallelepiped, i.e. the two faces formed by the long dimension L and the intermediate dimension l and the two faces formed by the long dimension L and the short dimension c, for example by connecting together two of the vertices of the same face of the rectangular parallelepiped by describing a diagonal on each of the faces.

The mesh structure 50 thus here comprises eight bars 52.

Each of the bars 52 is terminated by a ball 53, located at a vertex of the rectangular parallelepiped. Several bars 52 may terminate in the same ball 53 if these bars terminate at the same vertex of the rectangular parallelepiped. The mesh structure 50 here comprises eight balls 53, i.e. one ball at each vertex of the rectangular parallelepiped.

A particular example of patterns 50a has been described here but it is clear that the mesh structure 50 can take on an infinite number of shapes. Indeed, there are an infinite number of patterns 50*a* that could be used instead of the one described here, more or less efficient depending on their shape.

The mesh structure 50 allows oil to be recovered from the reduction gear 6 and then gently discharged away. The level of porosity of the structure 50 allows to slow down the flow of oil to a greater or lesser extent depending on requirements. The patterns 50*a* can also be oriented, in particular through the positioning of the various bars 52. The patterns 50*a* can thus be made to favour a certain direction, allowing the oil to be recovered efficiently while preventing it from overflowing. For example, it is possible to define the "absorption" gain as a function of the geometry of the mesh structure 50 to best improve the lubrication.

As described above, the device 100 of the invention is in particular an epicyclic or planetary reduction gear 6. This device 100 could also be an accessory gearbox (AGB), or a reduction gearbox (RGB). It could also be integrated into "straight" walls as a simple deflector.

The invention also relates to a turbine engine 1, in particular for an aircraft, comprising an oil collector 20 as described above.

The invention brings several advantages and in particular allows to ensure good oil suction, to reduce losses by transfer of momentum, to reduce the mass temperature of the planet gears 8, 8' and the heating of the components and to increase the margin against seizure.

The collector 20 of the invention has been described in relation to a torque reduction device but could be applied to other areas without going beyond the scope of the invention.

The invention claimed is:

1. An oil collector for a torque transmission device of an aircraft turbine engine, this oil collector being configured to collect sprayed oil, wherein it comprises:
    at least one outer wall formed at least in part by a porous lattice structure, said porous lattice structure being suitable to capture oil, and
    at least one oil recovery device located at one end of the at least one outer wall and configured to recover the oil captured by said porous lattice structure and intended to flow from said porous lattice structure to the at least one oil recovery device,
wherein said porous lattice structure is composed of parallelepipedal patterns,
wherein each of said patterns comprises bars connected to each other.

2. The oil collector according to claim 1, wherein said at least one outer wall has a constant thickness and/or said porous lattice structure has a constant thickness.

3. The oil collector according to claim 1, wherein said porous lattice structure is composed of rectangles or squares.

4. The oil collector according to claim 3, wherein some of said bars extend along edges of said parallelepipedal patterns.

5. The oil collector according to claim 1, wherein said at least one outer wall comprises two independent outer walls each formed at least in part by a porous lattice structure, the collector having a general I-shape and said independent outer walls extend laterally on the two longer sides of this I.

6. The oil collector of claim 5, wherein said independent outer walls are each generally curved and have convex curved surfaces facing each other.

7. The oil collector according to claim 5, wherein said at least one oil comprises a first recovery device which extends between first ends of both independent outer walls and at one end of the I-shape, and a second recovery device which extends between opposite second ends of these independent outer walls and at an opposite end of the I-shape.

8. The oil collector according to claim 1, wherein said at least one oil recovery device is generally U-shaped.

9. The oil collector according to claim 8, wherein said oil collector comprises two independent outer walls each formed at least in part by a porous lattice structure, the collector having a general I-shape and said independent outer walls extend laterally on the two longer sides of said I-shape, said independent outer walls are each generally curved and have convex curved surfaces facing each other, and said at least one oil recovery device comprises a bottom bulkhead extending between two lateral bulkheads, the lateral bulkheads each having a generally curved shape and extending in line with said independent outer walls.

10. The oil collector according to claim 9, wherein each of said two independent outer walls extends between two lateral bulkheads and has a curvature radius which is the same as a curvature radius of said two lateral bulkheads.

11. The oil collector according to claim 1, wherein said at least one outer wall and said at least one oil recovery device define an inner cavity of the collector which is empty.

12. The device according to claim 11, wherein the device is a planetary or epicyclic reduction gear, an accessory gearbox, or a gearbox.

13. A torque transmission device for an aircraft turbine engine, this device comprising meshed toothings and at least one oil collector according to claim 1, which is disposed adjacent to a toothing or interposed between two toothings and which is configured to collect oil centrifugally sprayed by at least one of these toothings.

14. The device according to claim 13, wherein, said oil collector comprises two independent outer walls each formed at least in part by a porous lattice structure, the collector having a general I-shape and said independent outer walls extend laterally on the two longer sides of said I-shape, said independent outer walls are each generally curved and have convex curved surfaces facing each other, each of said independent outer walls extending at least in part around one of the toothings and an axis of revolution of that toothing.

15. A turbine engine comprising a torque transmission device according to claim 13.

16. A turbine engine comprising an oil collector according to claim 1.

17. The oil collector according to claim 1, wherein each of said patterns comprises eight bars each terminating by a ball.

18. An oil collector for a torque transmission device of an aircraft turbine engine, this oil collector being configured to collect sprayed oil, wherein it comprises:
    at least one outer wall formed at least in part by a porous lattice structure, said porous lattice structure being suitable to capture oil, and
    at least one oil recovery device located at one end of the at least one outer wall and configured to recover the oil captured by said porous lattice structure and intended to flow from said porous lattice structure to the at least one oil recovery device,
wherein said porous lattice structure is composed of parallelepipedal patterns,
wherein each of said patterns comprises bars connected to each other, and
wherein each of said patterns comprises eight bars.

19. An oil collector for a torque transmission device of an aircraft turbine engine, this oil collector being configured to collect sprayed oil, wherein it comprises:

at least one outer wall formed at least in part by a porous lattice structure, said porous lattice structure being suitable to capture oil, and at least one oil recovery device located at one end of the at least one outer wall and configured to recover the oil captured by said porous lattice structure and intended to flow from said porous lattice structure to the at least one oil recovery device, wherein said porous lattice structure is composed of parallelepipedal patterns, wherein each of said patterns comprises bars connected to each other, and wherein each of said patterns comprises bars at least some of said bars terminating by a ball.

* * * * *